United States Patent Office 3,245,821
Patented Apr. 12, 1966

3,245,821
EXTENDER FOR OIL-BASE PAINT
Charles Wesley Skinner, 181 Torrey St., Brockton, Mass.
No Drawing. Filed July 30, 1962, Ser. No. 213,096
2 Claims. (Cl. 106—311)

This invention relates to a composition of matter by the use of which an oil-base paint can be doubled in quantity and improved in quality through the addition of an equal amount of water. This composition is effective with any kind of oil-base paint, interior or exterior, white or colored, gloss, semi-gloss, or flat, not only to double the volume of the paint but to improve the quality of the paint in terms of coverage, weathering and aging.

My novel composition, or paint extender, is made according to the following formula:

| | |
|---|---|
| Oil (e.g. linseed oil) _____fl. oz.__ | 50 |
| Aliphatic hydrocarbon (e.g. naphtha) _____fl. oz.__ | 60 |
| Kerosene, preferably odorless _____fl. oz.__ | 50 |
| Antifreeze (e.g. methanol) _____fl. oz.__ | 10 |
| Cobalt naphthenate drier _____fl. oz.__ | 4 |
| Tetrachlorophenol _____fl. oz.__ | 4 |
| Essential oil (e.g. oil of wintergreen) _____fl. oz.__ | 2 |
| Synthetic detergent _____fl. oz.__ | 10 |
| Sodium chloride _____lbs.__ | 1½ |

The extender is used as follows: One gallon of oil-base paint, one gallon of water, and eight fluid ounces of the extender are put into a container and mixed in until the consistency is smooth. This will ordinarily take from three to eight minutes when the mixing is done by stirring with a paddle at a moderate speed. The augmented paint is then ready for use although it will usually have a greater viscosity than the original paint. If a thinner consistency is desired, this may be had by adding mineral spirits or turpentine.

The paint, extended as described, may be applied by brush or spray, gives excellent coverage, retains its brilliance of color, stands up well against adverse weather conditions, and does not peel or mildew. When the original paint is designed to chalk, the extender slows the chalking rate and thus increases its durability.

The formula as hereinbefore given is effective with all oil-base paints. When the extender is used with some paints which are relatively oil poor, the detergent and sodium chloride ingredients may be omitted.

The omission of the essential oil with its preservative function still leaves an effective paint extender with superior covering power, weathering and aging.

I claim:
1. A composition of matter for extending oil-base paints, comprising a mixture of the following ingredients in proportion to the quantities given:

| | Fluid oz. |
|---|---|
| Linseed oil _____ | 50 |
| Naphtha _____ | 60 |
| Kerosene _____ | 50 |
| Methanol _____ | 10 |
| Cobalt naphthenate drier _____ | 4 |
| Tetrachlorophenol _____ | 4 |

2. A composition of matter as described in claim 1, plus 2 fluid oz. of oil of wintergreen.

No references cited.

ALEXANDER H. BRODMERKEL, *Primary Examiner.*